(12) United States Patent
Xiang et al.

(10) Patent No.: US 11,663,339 B2
(45) Date of Patent: May 30, 2023

(54) SECURITY TESTING BASED ON USER REQUEST

(71) Applicant: INTERNATIONAL BUSINESS MACHINES CORPORATION, Armonk, NY (US)

(72) Inventors: Jun Long Xiang, Beijing (CN); Qi Li, Beijing (CN); Wei Liu, Beijing (CN); Guo Qing Deng, Beijing (CN)

(73) Assignee: International Business Machines Corporation, Armonk, NY (US)

(*) Notice: Subject to any disclaimer, the term of this patent is extended or adjusted under 35 U.S.C. 154(b) by 474 days.

(21) Appl. No.: 16/527,241

(22) Filed: Jul. 31, 2019

(65) Prior Publication Data

US 2021/0034754 A1 Feb. 4, 2021

(51) Int. Cl.
*G06F 21/57* (2013.01)
*G06F 11/36* (2006.01)

(52) U.S. Cl.
CPC ........ *G06F 21/577* (2013.01); *G06F 11/3684* (2013.01); *G06F 11/3688* (2013.01); *G06F 2221/033* (2013.01)

(58) Field of Classification Search
CPC ............... G06F 21/577; G06F 11/3684; G06F 11/3688; G06F 2221/033
See application file for complete search history.

(56) References Cited

U.S. PATENT DOCUMENTS

| | | | |
|---|---|---|---|
| 6,584,569 B2* | 6/2003 | Reshef | G06F 21/554 709/203 |
| 7,272,782 B2* | 9/2007 | Sneh | G06F 40/174 715/205 |
| 7,877,732 B2* | 1/2011 | Day | G06F 11/3414 717/124 |
| 8,001,422 B1* | 8/2011 | Sun | G06F 11/263 714/28 |
| 8,601,586 B1 | 12/2013 | Boutros | |

(Continued)

FOREIGN PATENT DOCUMENTS

CN 104184728 A 12/2014

OTHER PUBLICATIONS

Veracode, "Dynamic Analysis is Critical to Application Security", AppSec Knowledge Base, Dynaminc Analysis, https://www.veracode.com/products/dynamic-analysis-dast/dynamic-analysis, Accessed on Jan. 4, 2019, 5 pages.

(Continued)

*Primary Examiner* — Douglas M Slachta
(74) *Attorney, Agent, or Firm* — Jordan T. Schiller

(57) ABSTRACT

Implementations of the present disclosure relate to security testing based on user request. According to the method, a first request for a target application is received from a first user. A first malicious request is generated by modifying the first request, wherein the first malicious is associated with a malicious action on the target application. The first malicious request is sent to an offline instance of the target application. A first security level of the target application against the malicious action is determined based on a first response generated by the offline instance in response to the first malicious request. In other implementations, a system and a computer program product for process tracking are disclosed.

18 Claims, 7 Drawing Sheets

(56) References Cited

U.S. PATENT DOCUMENTS

| | | | |
|---|---|---|---|
| 9,058,428 B1* | 6/2015 | Siddiqui | G06F 11/3433 |
| 9,213,832 B2* | 12/2015 | Amit | G06F 21/552 |
| 9,264,443 B2* | 2/2016 | Weisman | G06F 21/577 |
| 9,300,562 B2* | 3/2016 | Dufour | H04L 43/12 |
| 9,323,926 B2* | 4/2016 | Cabrera | H04L 63/1441 |
| 9,374,389 B2* | 6/2016 | Bishop | H04L 41/5009 |
| 9,501,650 B2* | 11/2016 | Chess | H04L 63/1433 |
| 9,558,106 B1* | 1/2017 | Moniz | G06F 11/3692 |
| 9,749,305 B1* | 8/2017 | Sharifi Mehr | G06F 21/606 |
| 9,836,388 B1* | 12/2017 | Moniz | G06F 11/3692 |
| 10,467,206 B2* | 11/2019 | Maier | G06F 16/215 |
| 10,496,530 B1* | 12/2019 | Angermayer | G06F 11/3692 |
| 10,521,288 B2* | 12/2019 | Segal | G06F 11/0784 |
| 10,761,913 B2* | 9/2020 | McClory | G06Q 10/06398 |
| 10,901,874 B2* | 1/2021 | Fok | G06F 11/3404 |
| 11,360,880 B1* | 6/2022 | Arora | G06F 11/3692 |
| 2012/0255023 A1* | 10/2012 | Maor | G06F 21/56 726/25 |
| 2012/0297476 A1* | 11/2012 | Zeljkovic | H04L 63/145 726/22 |
| 2012/0310625 A1* | 12/2012 | Wei | G06F 11/3688 704/8 |
| 2013/0167237 A1* | 6/2013 | Amit | H04L 63/1433 726/25 |
| 2014/0109228 A1* | 4/2014 | Kalman | G06F 21/577 726/25 |
| 2014/0250425 A1* | 9/2014 | Kumar | G06Q 10/06 717/121 |
| 2015/0096036 A1* | 4/2015 | Beskrovny | G06F 21/577 726/25 |
| 2016/0127389 A1 | 5/2016 | Hunt | |
| 2017/0264378 A1* | 9/2017 | Simpson | H04B 17/102 |
| 2018/0004948 A1* | 1/2018 | Martin | G06F 21/552 |
| 2020/0327045 A1* | 10/2020 | Wang | G06F 11/3696 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

SECURITY TESTING BASED ON USER REQUEST

BACKGROUND

The present invention relates to the field of software testing, and more specifically, to security testing based on user request.

With a rapid development of the Internet technology, more and more web products are being used by people. The security of these web products is becoming more and more important to the users. Typically, the web products will have to pass some security testing before being released to the users. However, the running of the released web products may be affected if a security testing is directly performed on the online web product.

Therefore, it would be advantageous to test a security of a product without affecting the operation thereof.

SUMMARY

According to one embodiment of the present invention, there is provided d a computer-implemented method. According to the method, a first request for a target application is received from a first user. A first malicious request is generated by modifying the first request, wherein the first malicious is associated with a malicious action on the target application. The first malicious request is sent to an offline instance of the target application. A first security level of the target application against the malicious action is determined based on a first response generated by the offline instance in response to the first malicious request.

According to another embodiment of the present invention, a computer-implemented system is disclosed. The system may include one or more processors; a memory coupled to at least one of the one or more processors; a set of computer program instructions stored in the memory and executed by at least one of the one or more processors to perform actions of the above method.

In yet another aspect, a computer program product is disclosed. The computer program product comprises a computer readable storage medium having program instructions embodied therewith. When executed on one or more processors, the instructions may cause the one or more processors to perform the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
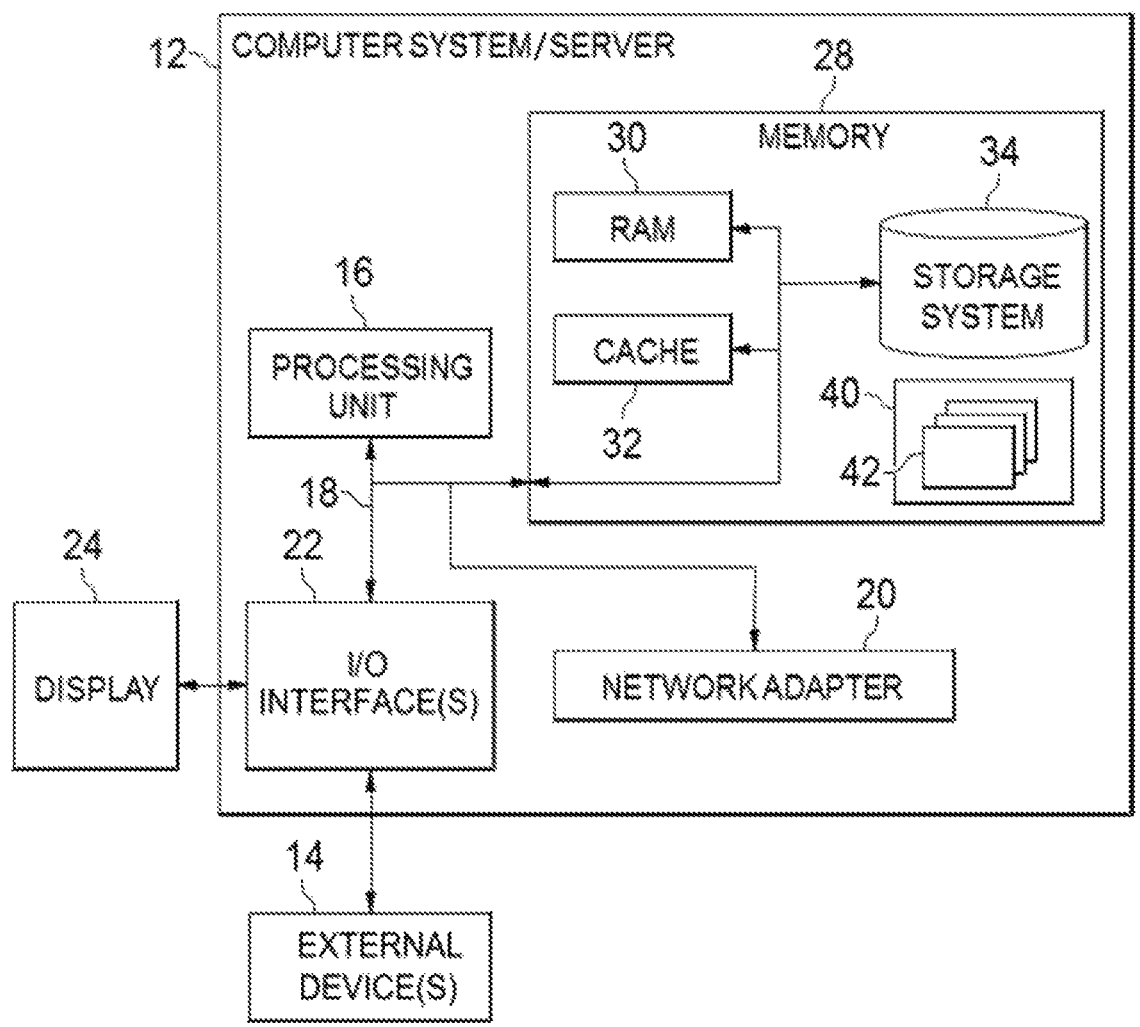
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
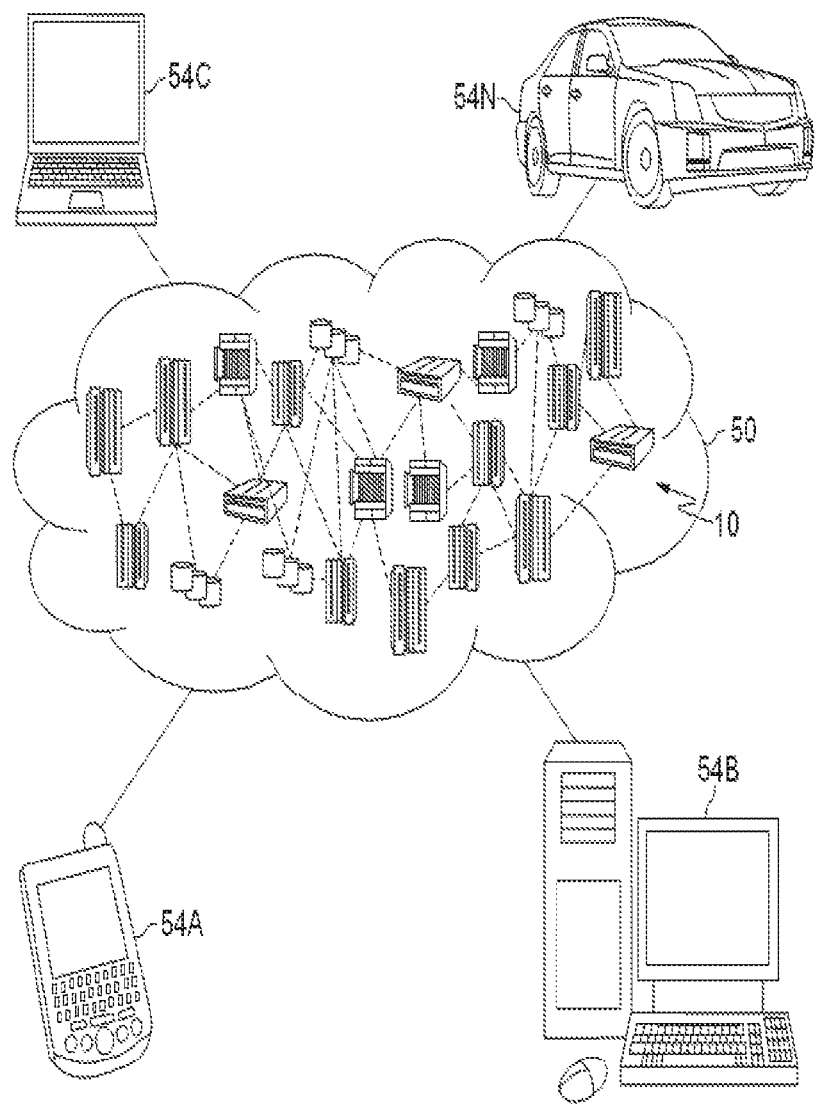
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
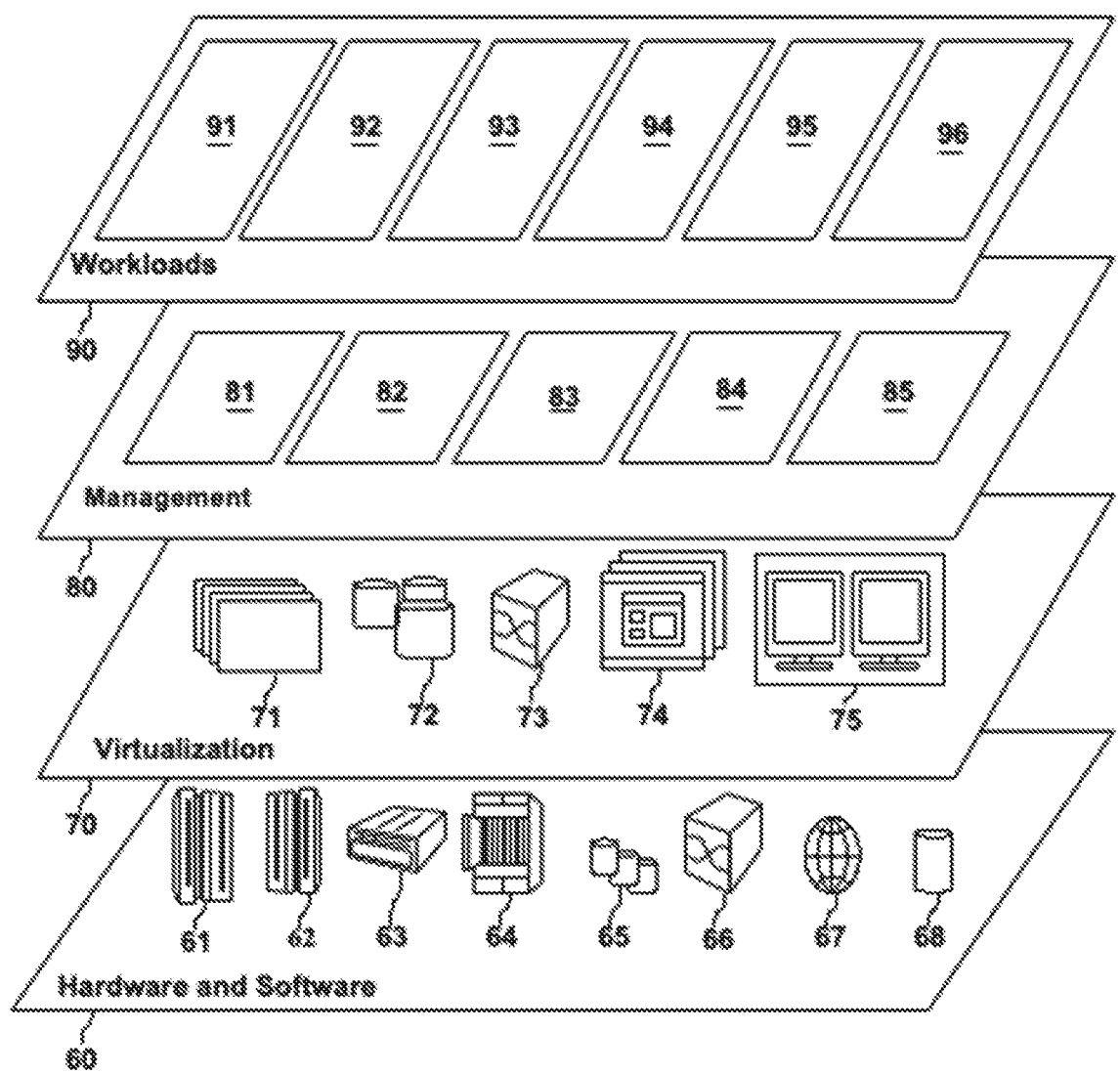
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security testing 96. The security testing 86 may implement the solution of determining the security level of a target application based on the offline instance's response to the malicious requests generated based on normal user requests to the target application.

Upon developing an application or a web product, a security test (e.g., a penetration test) is typically needed before releasing the application or product to the customers for ensuring the security. In a traditional security test for a web product, a single testing tool (e.g., AppScan) is used, based on a crawler or a tester's manual input, to explore the structures of the web product, for example, pages, interfaces or web services. However, such a testing tool can hardly cover all the test cases needed for the web product.

Further, in a traditional testing solution, it would be difficult to test a released web product against new security vulnerabilities. For example, after a web product has passed an old version of a testing tool and has then been released online, the testers can hardly implement new tests on the online web product since the stability of the online web product may be affected. Then, the released web product may be in a risk for being attacked by the new malicious actions.

In order to at least partially solve one or more of the above problems and other potential problems, example embodiments of the present disclosure propose a solution for security testing. In general, a malicious request may be generated by modifying a user request for a target application, wherein the malicious request is associated with a malicious action on the target application. The malicious request is then sent to an offline instance of the target application, rather than the target application itself. The security level of the target application against the malicious action may then be determined based on the response received from the offline instance to the malicious request. In this way, a released target application may be automatically tested against any new vulnerability, without affecting the running of the online target application. Further, the generated malicious requests are based on different types of real-time user requests, and more testing scenarios would thus be covered as compared to a traditional security testing solution.

Figure 4:
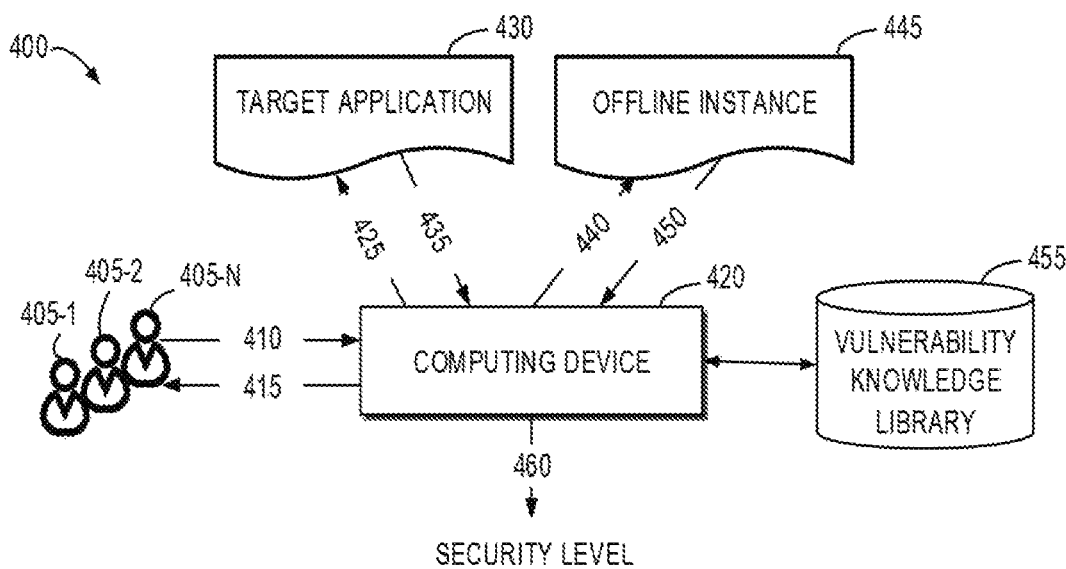
FIG. 4 depicts an environment in which embodiments of the present invention can be implemented.

Reference is first made to FIG. 4, which depicts an environment 400 in which embodiments of the present invention can be implemented. As shown in FIG. 4, the environment 400 comprises a computing device 420. The computing device 420 may receive real-time user requests 410 for an online target application 430 from users 405-1, 405-2, and 405-N (individually or jointly referred to as user 405) for example through respective user clients. Like a normal web product, the real-time user requests 410 would be forwarded by computing device 420 to the target application 430 as a message 425, for accomplishing the user 405's tasks associated with the request 410. Similarly, the computing device 420 may forward an application response 435 received from the target application 430 to the user 405 as a message 415.

Additionally, while forwarding the real-time user request 410 to the target application, the computing device 420 may generate one or more malicious request 440 based on the real-time user request 410. For example, the computing device may modify the real-time user request 410 based on vulnerability rules retrieved from a vulnerability knowledge library 455. In some embodiments, one or more vulnerability rules indicating at least a characteristic of one or more malicious actions may be saved in the vulnerability knowledge library 455. Based on a vulnerability rule, the computing device 420 would be able to generate a malicious request associated with the vulnerability rule from a normal user request. For example, a portion of a real-time Hyper Text Transport Protocol (HTTP) user request 410 may be modified according to the retrieved one or more vulnerability rules, so as to generate one or more malicious requests 440. In this way, different types of possible malicious requests may be automatically simulated, thereby improving the accuracy of the security testing.

As shown in FIG. 4, one or more generated malicious requests 440 may then be sent to an offline instance 445 of the target application 430. In some embodiments, the offline instance 445 may be a duplication of the target application 430, and therefore would have the same vulnerability risks as the online target application 430. The term "offline" herein means the instance 445 would not serve to respond to a user 405's real-time request 410 for accomplishing the user 405's task, though the instance 445 may also be deployed on Internet. By sending the malicious requests 440 to the offline instance 445, new vulnerabilities may be tested for the target application 430, without affecting the operation of the online target application 430.

Responsive to the malicious request 440, the offline instance 445 can generate a corresponding response 450 and send it to the computing device 420. Based on the received response 450, the computing device 420 may determine a security level 460 of the target application 430 against the malicious action. In some embodiments, the computing device 420 may determine the security level 460 based on the vulnerability knowledge library 455. For example, the vulnerability knowledge library 455 may also provide one or more predetermined responses, the reception of which may indicate that there is vulnerability associated with a corresponding malicious action in the target application 430. In this way, the computing device 420 may automatically determine a security level for the target application 430 without any manual input.

Figure 5:
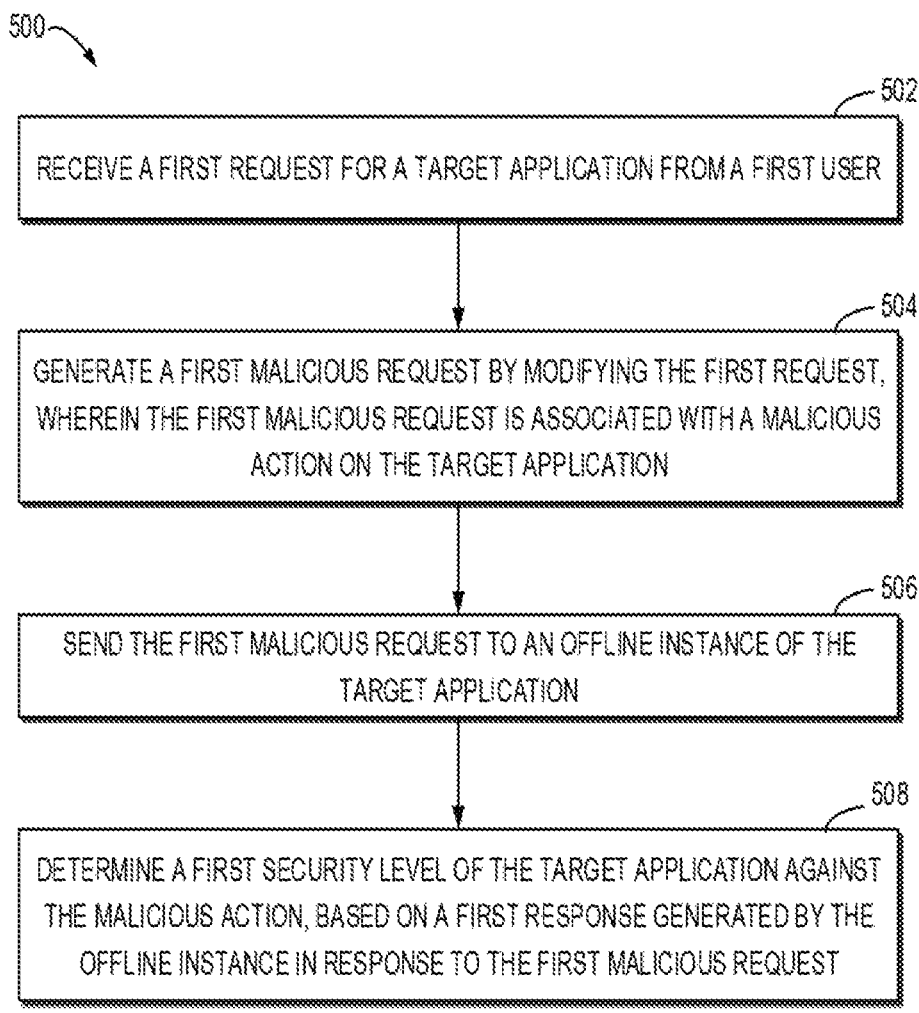
FIG. 5 depicts a flowchart of a method for security testing according to an embodiment of the present invention.

FIG. 5 illustrates a flowchart of a method 500 of security testing according to embodiments of the present disclosure. The method 500 can be implemented by the computing device 420 shown in FIG. 4. Acts involved in the method 500 will be described with reference to the environment 400 as shown in FIG. 4.

At block 502, the computing device 420 receives a request 410 (referred to as "first request" for clarity) for a target application from a user 405-1 (referred to as "first user" for clarity.) As shown in FIG. 4, rather than being sent directly to the target application 430, the first request 410 for the target application 430 is sent firstly to a computing device 420, which may implement a security testing solution according to embodiments of the present invention. In some embodiments, due to the huge amount of the real-time user requests, a selecting mechanism may be applied to the user requests to select the request 410 to be sent to the computing device 420 for simulating malicious attacks. For example, requests from a known malicious user or a user ever associated with a malicious action may be preferentially selected. In another example, request 410 may be randomly selected from the whole real-time user requests, thereby enriching the scenarios that could be covered by the selected requests 410.

In some embodiments, the request 410 may be a Hyper Text Transport Protocol (HTTP) request for an online web application. For example, the user request 410 may be a PUT HTTP request used for modifying resources, which is defined as below.

```
PUT /demo/Display/Settings
{
"version":"1.0.0",
"color":"red",
"domain": "Fdonmain",
"name": "MyZoo"
}
```

At block 504, the computing device 420 generates a malicious request 440 (referred to as "first malicious request" for clarity) by modifying the first request 410, wherein the first malicious request 440 is associated with a malicious action on the target application 430. In some embodiments, the computing device 420 may generate a malicious request 440 based on manual input. For example, a normal PUT request may be modified to a malicious request associated with a Cross-Site Scripting (XSS) attack. Continuing with the example of the PUT request discussed above, a tester may manually input "<script> javascript: alert(1234) <script>" to replace the value of "name" in the first request 410, thereby obtaining a malicious request 440 as below.

```
PUT /demo/Display/Settings
{
"version":"1.0.0",
"color":"red",
"domain": "Fdonmain",
"name": "<script>javascript:alert(1234)<script>"
}
```

In some further embodiments, the computing device 420 may modify at least a portion of the first request 410 according to a characteristic of the malicious action. In particular, as stated above with reference to FIG. 4, the computing device 420 may first retrieve one or more vulnerability rules from a vulnerability knowledge library 455, which may be stored in a storage device external to or within the computing device 420. In some embodiments, a vulnerability rule may define at least a characteristic of a corresponding malicious action. For example, with regard to a malicious action related to an XSS attack, the vulnerability rule may be defined to indicate at least a characteristic of an XSS attack. The characteristic would instruct the computing device 420 how to change a body parameter of a request to a query parameter. In some further embodiments, the vulnerability rule may further define a request template used for generating a corresponding malicious request. For example, the template may be a description such as "<script>javascript:alert(X)<script>", wherein X may be replaced with any string. Based on such a description, the computing device 420 may modify at least a portion of the first request 410 to generate the first malicious request 440 by using the request template. In this way, a malicious request 440 associated with a malicious action to be tested against may be automatically generated based on a real-time user request 410.

In some embodiments, the single first malicious request 440 may be associated with more than one malicious action. In particular, a first malicious request 440 may be generated with respective characteristics of more than one malicious action. For example, the PUT request 410 would be modified to be a malicious request 440 associated with both an XSS attack action and a cross site request forgery (CSRF) attack action. In this way, the first malicious request 440 may be used to test the target application 430 against more than one malicious action.

Additionally, more than one malicious request 440 may be generated based on a single real-time user request 410. In particular, the computing device 420 may generate more than one malicious request 440 associated with a single kind of malicious action to enrich the variety of the malicious requests 440. For example, continuing with the example of the PUT request, the computing device 420 may generate more than one malicious request associated with an XSS attack by replacing different fields using the template retrieved from the vulnerability knowledge library 455 respectively. Additionally, or alternatively, the computing device 420 may generate more than one malicious request 440 associated with different types of malicious actions respectively. For example, the PUT request 410 as discussed above may be modified to be a malicious request associated with a XSS attack action, and be modified to be another malicious request associated with a CSRF attack action and the like at one time, for example, based on different vulnerability rules retrieved from a vulnerability knowledge library 455. In this way, the malicious actions associated with the generated malicious requests may be enriched, thereby improving the accuracy of the security testing.

It should be noted that the specific types of malicious actions discussed herein are merely illustrative and are not intended to suggest any limitation as to the scope of use of functionality of embodiments of the invention described herein.

At block 506, the computing device 420 sends the first malicious request 440 to an offline instance 445 of the target application 430. As discussed above with reference to FIG. 4, in order to avoid any possible effect on the online target application 430, the generated malicious request 440 is sent to an offline instance 445 of the target application 430. The offline instance 445 may be an offline duplication of the target application 430 with the same user data and application data, and therefore would have the same vulnerability risks as the online target application 430. It should be noted that the term "offline" herein means the instance 445 would not serve to respond to a user 405's real-time request 410 to accomplish the user 405's task, though the instance 445 may be deployed on Internet. In some embodiments, the offline instance may 445 merely serve for the security testing, and would only receive and respond to the generated malicious requests 440. By using an offline instance 445 for security testing, the solution according to embodiments of the present invention may support the security testing even after the target applications or products have been released, thereby facilitating the fixing or updating for the vulnerability existing on the online target application.

At block 508, the computing device 420 determines a security level 460 (referred to as "first security level" for clarity) of the target application 430 against the malicious action, based on a response 450 (referred to as "first response" for clarity) generated by the offline instance 445 in response to the first malicious request 440. Since the offline instance 445 is a duplication of the target application 430, the offline instance would be able to generate a response 450 responsive to the malicious request 440, and the response 450 would therefore be the same as a possible response that would be generated by the online target application 430 if the malicious request 440 were received by the target application 430. Thus, the response 450 is able to indicate any security risk associated with the online target application 430.

In some embodiments, the computing device 420 may determine the first security level 460 based on a type of the first response 450. For example, if the response 450 indicates that the malicious has been successfully executed by the offline instance 446, the computing device 420 may associate the target application 430 with a potential vulnerability for the malicious action. For example, continuing with the example of a XSS malicious request, if the type of the first response is "200" and the response further contains the same value "<script>javascript:alert(1234)<script>" for the field "name", it may indicate that the first malicious request 440 associated with a XSS attack action has been successfully executed without any protection. The computing device 420 may then associate the target application 430 with a potential vulnerability for an XSS attack action, and the first security level 460 may be set to a low security level. For example, the security level may be represented with a number, wherein a less number may indicate a higher security level.

Figure 6:
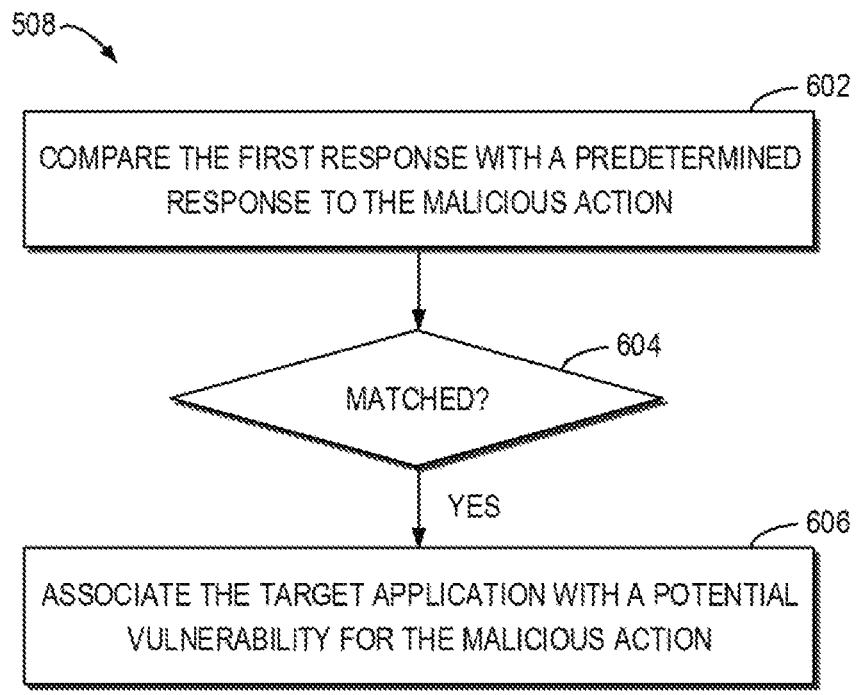
FIG. 6 depicts a flowchart of a method for determining a security level according to an embodiment of the present invention.

In some further embodiments, the security level 460 may be determined by comparing the response 460 with a predetermined response. The step of block 508 will now be described in detail with reference to FIG. 6, which depicts a flowchart of a method for determining a security level according to an embodiment of the present invention. As shown in FIG. 6, at block 602, the computing device 420 compares the first response 450 with a predetermined response to the malicious action. In some embodiments, the predetermined response may be retrieved from the vulnerability knowledge library 455. Continuing with the example of an XSS malicious request, a predetermined response may be defined as below.

Content-type: text/plain;charset=UTF-8 {"color":"red, "domain": "Fdomain", "name": "<script>javascript:alert (1234)<script>"}

The type of the predetermined response is set to be "200" and the value "<script>javascript:alert(1234)<script>" of the field "name" is set unchanged as compared to the malicious request 440. As stated above, a value "200" of type would indicate that the malicious request has been executed and the value of the filed "name" would further indicate that the script has not been filtered or encoded by the application. That is, the predetermined response may be an example response in a case that the malicious request has been successfully executed. In some embodiments, the predetermined response may include only the key portions of an example response which would be sufficient to indicate corresponding vulnerability on the target application, and the other useless portions could be emitted accordingly. The computing device 420 may then only compare the key portions in the first response 450 and the predetermined response, thereby decreasing the amount of calculation.

At block 604, the computing device 420 determines whether there is a match between the first response 450 and the predetermined response. Further, in response to determining a match between the first response 450 and the predetermined response at block 604, the process proceeds to block 606, where the computing device 420 associates the target application 430 with a potential vulnerability for the malicious action. Continuing with the example of a XSS malicious request, if the value of "type" and the value of "name" in the first response 450 match with the predetermined response, the computing device 420 may then associate the target application 430 with a potential vulnerability for a XSS attack action, and the first security level 460 may be set to a low security level. In this way, a security level of an online target application may be automatically determined without any manual input, thereby improving the efficiency of security testing.

In some embodiments, in response to determining that the first response 450 indicates a security risk, the computing device 420 may provide an alert and send the first response 450 for example to a tester for a further manual confirmation. In this way, an incorrect determination regarding vulnerability may be avoided. In some further embodiments, if vulnerability on the target application 430 is confirmed, the first malicious request 440 and the corresponding first response 450 may be saved in a storage device for a further analysis, which may help the developers of the target application 430 to fix the vulnerability.

In some embodiments, the computing device 420 may further compare the determined first security level 460 with a predetermined threshold level. In response to the first vulnerability level being below the predetermined threshold level, the computing device 420 may provide an indication of a potential vulnerability associated with the malicious action. Therefore, a tester may be automatically informed of the potential vulnerability associated with the malicious action, for example, through email, short message, and the like.

In some embodiments, the method 200 may further comprises forwarding the first request 410 to the target application 430, and forwarding, to the first user 405-1, an application response 435 generated by the target application 430 in response to the first request 410. In this way, the running of the online target application 430 would not be affected by the security testing.

With the security testing solution provided according to embodiments of the present invention, different types of malicious request may be automatically generated based on the real-time requests received from the users, therefore significantly enriching the testing scenarios that could be covered. Further, by using an offline instance 445 to respond to the generated malicious requests, the solution according to embodiments of the present invention may discover any vulnerability existing on the target applications even if the target applications or products have been released, thereby improving the security of the target application.

Figure 7:
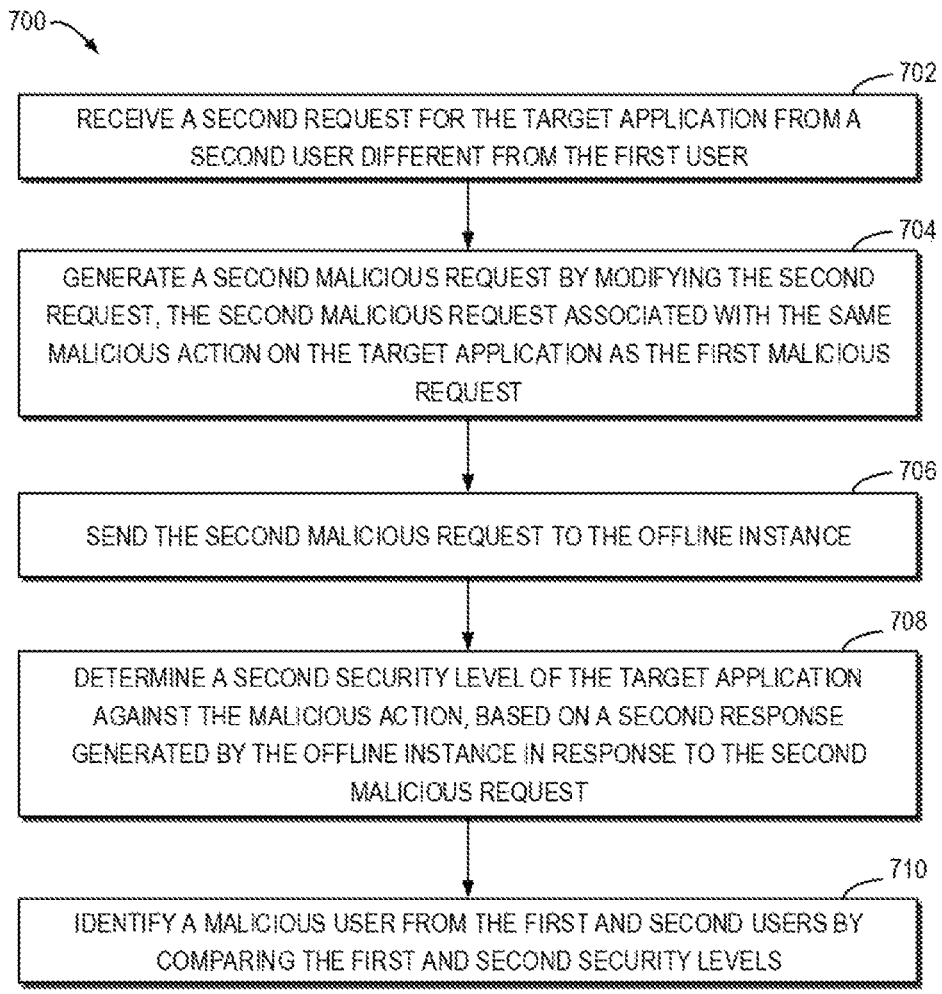
FIG. 7 depicts a flowchart of a method for security testing according to another embodiment of the present invention.

In some embodiments, vulnerability on a target application may be associated with some particular users. The solution of the present invention may be further applied to request from a set of users for determining any potential malicious user from the set of users. FIG. 7 depicts a flowchart of a method 700 for security testing according to another embodiment of the present invention. The method 700 can be implemented by the computing device 420 shown in FIG. 4. Acts involved in the method 700 will be described with reference to the environment 400 as shown in FIG. 4. It should be noted that, the acts in the method 700 may be implemented after act 508 or be implemented according to any proper sequence.

At block 702, the computing device 420 receives a request (referred to as "second request" for clarity) for the target application from a user 405-2 (referred to as "second user" for clarity) different from the first user 405-1. At block 704, the computing device 420 generates a malicious request (referred to as "second malicious request" for clarity) by modifying the second request, wherein the second malicious request is associated with the same malicious action on the target application as the first malicious request 440. To determine a potential malicious user, form a set of users, the generated malicious requests shall be associated with a same malicious action, such that vulnerability associated with a particular user may be determined. At block 706, the computing device 420 sends the second malicious request to the offline instance 445. The steps of blocks 702 to 706 may be performed according to the description of blocks 502 to 506.

At block 708, the computing device 420 determines a security level (referred to as "second security level" for clarity) of the target application against the malicious action, based on a response (referred to as "second response" for clarity) generated by the offline instance in response to the second malicious request. Similarly, the computing device 420 may determine the second security level according to the description of block 508.

At block 710, the computing device 420 identifies a malicious user from the first and second users 105-1 and 105-2 by comparing the first and second security levels. For example, if the first response indicates vulnerability in the target application 430 while the second response indicates no vulnerability, the computing device 420 may determine that the vulnerability is associated with the first user, and may further identify the first user as a malicious user. In another example, if the first security level is lower than the second security level, the computing device 420 may determine that the vulnerability is associated with the first user, and may further identify the first user as a malicious user.

Based on the method stated above, the solution according to embodiments of the present invention may not only identify any potential vulnerability on a target application, but also be able to identify a malicious user from a set of users based on the malicious requests generated from the respective user requests, thereby improving the security of an online target application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   automatically intercepting at random, by one or more processors, one or more of a plurality of requests in real-time for a deployed target application;
   modifying, by the one or more processors, the one or more of the plurality of intercepted requests, based on one or more vulnerability rules retrieved from a vulnerability knowledge library, to generate one or more malicious requests, wherein the one or more malicious requests are associated with one or more malicious actions on the target application, and wherein the generated one or more malicious requests are based on different types of real-time user requests, and wherein the one or more vulnerability rules indicate at least a characteristic of the one or more malicious actions;
saving the one or more vulnerability rules indicating at least a characteristic of the one or more malicious actions in the vulnerability knowledge library;
directing, by the one or more processors, only the generated one or more malicious requests to an offline instance of the target application, wherein the offline instance is a duplicate of the target application;
receiving, by the one or more processors, a response to the generated one or more malicious requests from the offline instance of the target application in real-time, wherein the response indicates a security level of the target application.

2. The method of claim 1, further comprising:
forwarding, by one or more processors, one or more of a plurality of unmodified requests directly to the target application, wherein the one or more of the plurality of unmodified requests are not intercepted; and
forwarding, by one or more processors, to a user of the target application, an application response to the unmodified request.

3. The method of claim 1, wherein modifying the one or more intercepted requests to generate the malicious request comprises:
modifying, by one or more processors, at least a portion of the request according to a vulnerability rule defined in a request template associated with the malicious action.

4. The method of claim 1, further comprising:
comparing, by one or more processors, the response with a predetermined response to the malicious action;
in response to determining a match between the response and the predetermined response, associating, by one or more processors, the target application with a potential vulnerability for the malicious action.

5. The method of claim 1, further comprising:
in response to the security level being below a predetermined threshold level, providing, by one or more processors, an indication of a potential vulnerability associated with the malicious action.

6. The method of claim 1, wherein the target application is an online web application and the request is a Hyper Text Transport Protocol (HTTP) request.

7. The method of claim 1, wherein more than one malicious request is generated for the same malicious action; and more than one malicious request is associated with more than one malicious action.

8. A system for security testing, comprising:
one or more processors;
a memory coupled to at least one of the one or more processors;
a set of computer program instructions stored in the memory and executed by at least one of the one or more processors to perform actions of:
automatically intercepting at random, by one or more processors, one or more of a plurality of requests in real-time for a deployed target application;
modifying, by the one or more processors, the one or more of the plurality of intercepted requests, based on one or more vulnerability rules retrieved from a vulnerability knowledge library, to generate one or more malicious requests, wherein the one or more malicious requests are associated with one or more malicious actions on the target application, and wherein the generated one or more malicious requests are based on different types of real-time user requests, and wherein the one or more vulnerability rules indicate at least a characteristic of the one or more malicious actions;
saving the one or more vulnerability rules indicating at least a characteristic of the one or more malicious actions in the vulnerability knowledge library;
directing, by the one or more processors, only the generated one or more malicious requests to an offline instance of the target application, wherein the offline instance is a duplicate of the target application;
receiving, by the one or more processors, a response to the generated one or more malicious requests from the offline instance of the target application in real-time, wherein the response indicates a security level of the target application.

9. The system of claim 8, the actions further comprising:
forwarding, by one or more processors, one or more of a plurality of unmodified requests directly to the target application, wherein the one or more of the plurality of unmodified requests are not intercepted; and
forwarding, by one or more processors, to a user of the target application, an application response to the unmodified request.

10. The system of claim 8, wherein modifying the one or more intercepted requests to generate the malicious request comprises:
modifying, by one or more processors, at least a portion of the request according to a vulnerability rule defined in a request template associated with the malicious action.

11. The system of claim 8, further comprising:
comparing, by one or more processors, the response with a predetermined response to the malicious action;
in response to determining a match between the response and the predetermined response, associating, by one or more processors, the target application with a potential vulnerability for the malicious action.

12. The system of claim 8, the actions further comprising:
in response to the security level being below a predetermined threshold level, providing an indication of a potential vulnerability associated with the malicious action.

13. The system of claim 8, wherein the target application is an online web application and the request is a Hyper Text Transport Protocol (HTTP) request.

14. A non-transitory computer readable storage medium storing machine-executable instructions, the instruction, when executed on a device, causing the device to perform actions including:
automatically intercepting at random, by one or more processors, one or more of a plurality of requests in real-time for a deployed target application;
modifying, by the one or more processors, the one or more of the plurality of intercepted requests, based on one or more vulnerability rules retrieved from a vulnerability knowledge library, to generate one or more malicious requests, wherein the one or more malicious requests are associated with one or more malicious actions on the target application, and wherein the generated one or more malicious requests are based on different types of real-time user requests, and wherein the one or more vulnerability rules indicate at least a characteristic of the one or more malicious actions;
saving the one or more vulnerability rules indicating at least a characteristic of the one or more malicious actions in the vulnerability knowledge library;
directing, by the one or more processors, only the generated one or more malicious requests to an offline instance of the target application, wherein the offline instance is a duplicate of the target application;

receiving, by the one or more processors, a response to the generated one or more malicious requests from the offline instance of the target application in real-time, wherein the response indicates a security level of the target application.

15. The computer program product of claim 14, the actions further comprising:

forwarding, by one or more processors, one or more of a plurality of unmodified requests directly to the target application, wherein the one or more of the plurality of unmodified requests are not intercepted; and forwarding, by one or more processors, to a user of the target application, an application response to the unmodified request.

16. The computer program product of claim 14, wherein modifying the one or more intercepted requests to generate the malicious request comprises:

modifying, by one or more processors, at least a portion of the request according to a vulnerability rule defined in a request template associated with the malicious action.

17. The computer program product of claim 14, further comprising:

comparing, by one or more processors, the response with a predetermined response to the malicious action;

in response to determining a match between the response and the predetermined response, associating, by one or more processors, the target application with a potential vulnerability for the malicious action.

18. The computer program product of claim 14, the actions further comprising:

in response to the security level being below a predetermined threshold level, providing an indication of a potential vulnerability associated with the malicious action.

\* \* \* \* \*